(12) United States Patent
Albero et al.

(10) Patent No.: US 6,873,286 B2
(45) Date of Patent: Mar. 29, 2005

(54) MOTOR VEHICLE DRIVING AID SYSTEM

(75) Inventors: Domenico Albero, Rivoli (IT); Pier Claudio Antonello, Pinerolo (IT); Sebastiano Campo, Turin (IT); Angela Chinu, Turin (IT); Renzo Cicilloni, Turin (IT); Silvia Citelli, Pavone Canavese (IT); Maurizio Miglietta, Turin (IT); Vincenzo Murdocco, Turin (IT); Valter Quenda, Turin (IT); Andrea Saroldi, Turin (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

(21) Appl. No.: 10/472,827

(22) PCT Filed: Mar. 25, 2002

(86) PCT No.: PCT/EP02/03329

§ 371 (c)(1),
(2), (4) Date: Sep. 25, 2003

(87) PCT Pub. No.: WO02/076781

PCT Pub. Date: Oct. 3, 2002

(65) Prior Publication Data

US 2004/0155811 A1 Aug. 12, 2004

(30) Foreign Application Priority Data

Mar. 26, 2001 (IT) .................................... TO2001A0282

(51) Int. Cl.⁷ .............................................. G01S 13/93
(52) U.S. Cl. ............................. 342/71; 342/70; 342/72; 342/109; 342/55; 701/93; 701/96; 701/301
(58) Field of Search ................................ 342/55, 70–72, 342/109; 701/70, 79, 93, 96, 110, 301

(56) References Cited

U.S. PATENT DOCUMENTS

| 5,332,057 A |   | 7/1994  | Ayumu et al. |
|-------------|---|---------|--------------|
| 5,485,892 A |   | 1/1996  | Fujita |
| 6,044,321 A | * | 3/2000  | Nakamura et al. ............ 701/96 |
| 6,121,915 A | * | 9/2000  | Cooper et al. ................ 342/70 |
| 6,317,073 B1| * | 11/2001 | Tamatsu et al. .............. 342/70 |

FOREIGN PATENT DOCUMENTS

| DE | 43 13 568 C   | 6/1994 |
| DE | 197 38 611 A  | 1/1999 |
| DE | 198 06 687 A  | 8/1999 |
| EP | 0 976 627 A   | 2/2000 |
| WO | WO 99/30920 A | 6/1999 |

* cited by examiner

*Primary Examiner*—Thomas H. Tarcza
*Assistant Examiner*—Isam Alsomiri
(74) *Attorney, Agent, or Firm*—Sughrue Mion, PLLC

(57) ABSTRACT

The system comprises: detector devices (1) operable to provide electrical signals indicative of the relative distance and relative speed of the motor vehicle (V) with respect to a fixed or moving obstacle (O) ahead, and a processing and control unit (ECU) connected to such detector devices (1) as well as to brake actuators (2–4) and arranged to cause activation of the brake actuators (2–4) to effect automatic emergency braking of the motor vehicle (V) when the relative distance between the motor vehicle (V) and an obstacle (O) ahead lies between a first predetermined limit value ($d_F$) equal to the minimum value at which it is still possible to avoid collision by braking and a preselected intermediate value ($d_E$) comprised between said first limit value ($d_F$) and a second limit value ($d_{Ecrit}$) which is less than the said first limit value ($d_f$) and is equal to the minimum relative distance value at which it is still possible to follow a path which avoids the obstacle (O), or when the relative distance ($d_R$) becomes less than said second limit value ($d_{Ecrit}$).

10 Claims, 8 Drawing Sheets

MOTOR VEHICLE DRIVING AID SYSTEM

This is a National Stage Entry of Application No. PCT/EP02/03329 filed Mar. 25, 2002; the disclosure of which is incorporated herein by reference.

BACKGROUND OF THE INVENTION

The present invention relates to a motor vehicle driving aid system, and in particular a system operable to avoid the occurrence of accidents or at least to limit their consequences, and in particular operable to avoid collisions against obstacles ahead and prevent the vehicle leaving the road.

Numerous systems have already been proposed for automatic vehicle braking. Such known systems tend essentially to cause automatic braking of a motor vehicle only on the basis of the relative distance and relative speed with respect to an obstacle ahead.

SUMMARY OF THE INVENTION

The object of the present invention is to provide an improved motor vehicle driving aid system provided with electrically-controlled brake actuator means.

According to a first aspect of the invention this object is achieved with a system comprising first detector means operable to provide electrical signals indicative of the relative distance and relative speed of the motor vehicle with respect to a fixed or moving object ahead, and processor and control means connected to the first and second detector means as well as to the said brake actuator means and arranged to cause activation of the brake actuator means to effect an automatic emergency braking of the vehicle, when the relative distance between the motor vehicle and an obstacle ahead is comprised between a first predetermined limit value which is equal to the minimum value at which it is still possible to avoid collision by braking and a preselected intermediate value, comprised between said first limit value and a second limit value, which is less than the said first limit value and is equal to the minimum value of the relative distance at which it is still possible to follow a path avoiding the obstacle, or when said relative distance becomes less than said second limit value.

BRIEF DESCRIPTION OF THE DRAWINGS

Further characteristics and advantages of the system according to the invention will become apparent from the following detailed description given purely by way of non-limitative example, with reference to the attached drawings, in which.

DETAILED DESCRIPTION OF THE INVENTION

Figure 1:
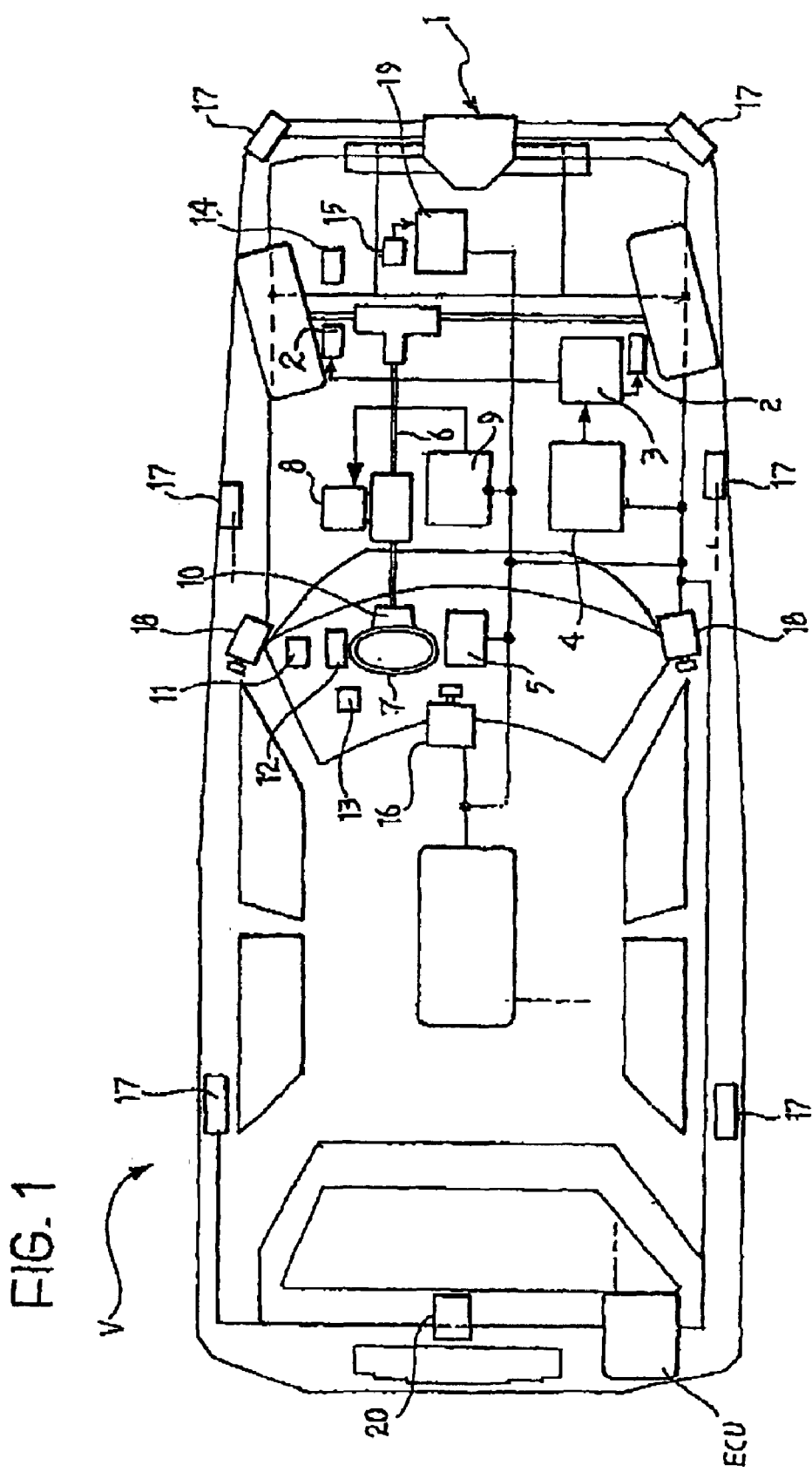
FIG. 1 is a schematic representation of a motor vehicle provided with a driving aid system according to the invention.

In FIG. 1 the reference V generally indicates a motor vehicle provided with a driving aid system according to the invention.

As will become more clearly apparent hereinafter in the description, a driving aid system according to the invention can be formed in such a way that it is able to perform one or more of a plurality of functions. For each of these functions the driving aid system requires that the motor vehicle V be provided with a particular plurality of devices. Such devices can be shared for the performance of different functions.

With reference to FIG. 1 the devices necessary to have on board the vehicle V for the purpose of being able to perform all the functions which will be described hereinafter will now be described. It will, however, be clear from the following description, as well as from the attached claims, which devices are specifically necessary for the performance of each specific function.

A first function performed by the driving aid system is that of "Emergency Braking".

This function aims to avoid the collision of the motor vehicle with a fixed or moving obstacle present in the path which it is just about to follow. The function provides for automatic actuation of the vehicle brakes at a suitable distance evaluated with respect to the obstacle.

The function can involve the emission of an alarm signal to indicate to the driver the imminent risk situation and to stimulate him (or her) to take the necessary actions to avoid the collision. If the driver does not intervene in the time necessary, for example, by being distracted or otherwise unable to act, the automatic braking occurs.

For actuation of the emergency braking function the motor vehicle V is provided with a frontal microwave radar apparatus 1, of the scanning type able to detect even stationary obstacles over a predetermined range of distances ahead of the motor vehicle. This radar apparatus is operable in particular to generate signals indicative of the relative speed $V_R$ and relative distance $d_R$ between the motor vehicle V and the possible obstacle ahead.

The frontal radar apparatus 1 is connected to an electronic processing and control unit ECU. The connection between the radar apparatus 1 and the unit ECU can be of direct type, that is to say dedicated, or can be achieved by means of a communications network installed on board the motor vehicle V, such as, for example, the CAN network.

The motor vehicle V is provided, in a manner known per se, with a braking system including actuator devices 2 piloted by an electro-hydraulic unit 3 in turn controlled by an electronic brake control unit 4.

The unit 4 is also connected to the electronic control unit, ECU, directly or via an on board communications network such as the CAN network.

The electronic processing and control unit ECU is also connected to a man-machine communications interface generally indicated 5.

A motor vehicle V is also provided with a steering column 6 connected to a steering wheel 7.

The steering column 6 is associated with an electric control actuator device 8 such as a DC electric motor, operable to cause rotation under the control of an electronic steering control unit 9, also connected to the electronic processing and control unit ECU.

The steering column 6 further has an associated sensor 10 operable to provide electrical signals indicative of the torque applied to this shaft by the driver.

The unit ECU has further sensors connected to it, such as a position sensor 11 associated with the brake control pedal, a position sensor 12 associated with the accelerator pedal, and a position sensor 13 operable to provide a signal indicative of the activation condition of the direction indicators.

The reference numerals 14 and 15 in FIG. 1 indicate further sensor devices operable to provide respective electrical signals indicative of the speed of the motor vehicle and the speed of rotation, or number of revolutions in unit time, of the internal combustion engine (not illustrated) of the motor vehicle.

This motor vehicle V is moreover provided with a further series of sensors which, as will become more clearly apparent hereinafter, are able to provide electrical signals usable to evaluate the possibility of following an avoidance course for avoiding an obstacle ahead. In the exemplary embodiment illustrated these sensors comprise at least one video camera 16 directed towards the area ahead of the motor vehicle, a series of lateral short-range radar systems 17 and a pair of video cameras 18 for monitoring the rear-side areas known as "blind spots".

In the exemplary embodiment illustrated the motor vehicle V is provided with two short-range radars 17 on each side, and a further short-range radar to cover the connection region of each side to the front of the motor vehicle.

The video camera or cameras 16, the short-range radars 17, and the video cameras 18 can be connected by means of interface devices to the processing and control unit ECU or alternatively can be connected to respective signal processing units in turn connected to the processing and control unit ECU.

The motor vehicle V of FIG. 1 is further provided with a rear detector or sensor device 20 also connected to the processing and control unit ECU to provide this latter with signals indicative of the presence and relative distance, as well as the relative speed of vehicles overtaking from behind the motor vehicle V. The detector or sensor 20 can be, for example, a microwave radar, or a lidar or a micro-video camera.

Several functions which can be performed by means of a driving aid system according to the invention, and in particular the following functions, will now be described:

emergency braking and possible obstacle avoidance, control of the longitudinal dynamics of the vehicle; and road lane maintenance.

Emergency Braking and Possible Obstacle Avoidance

Figure 2:
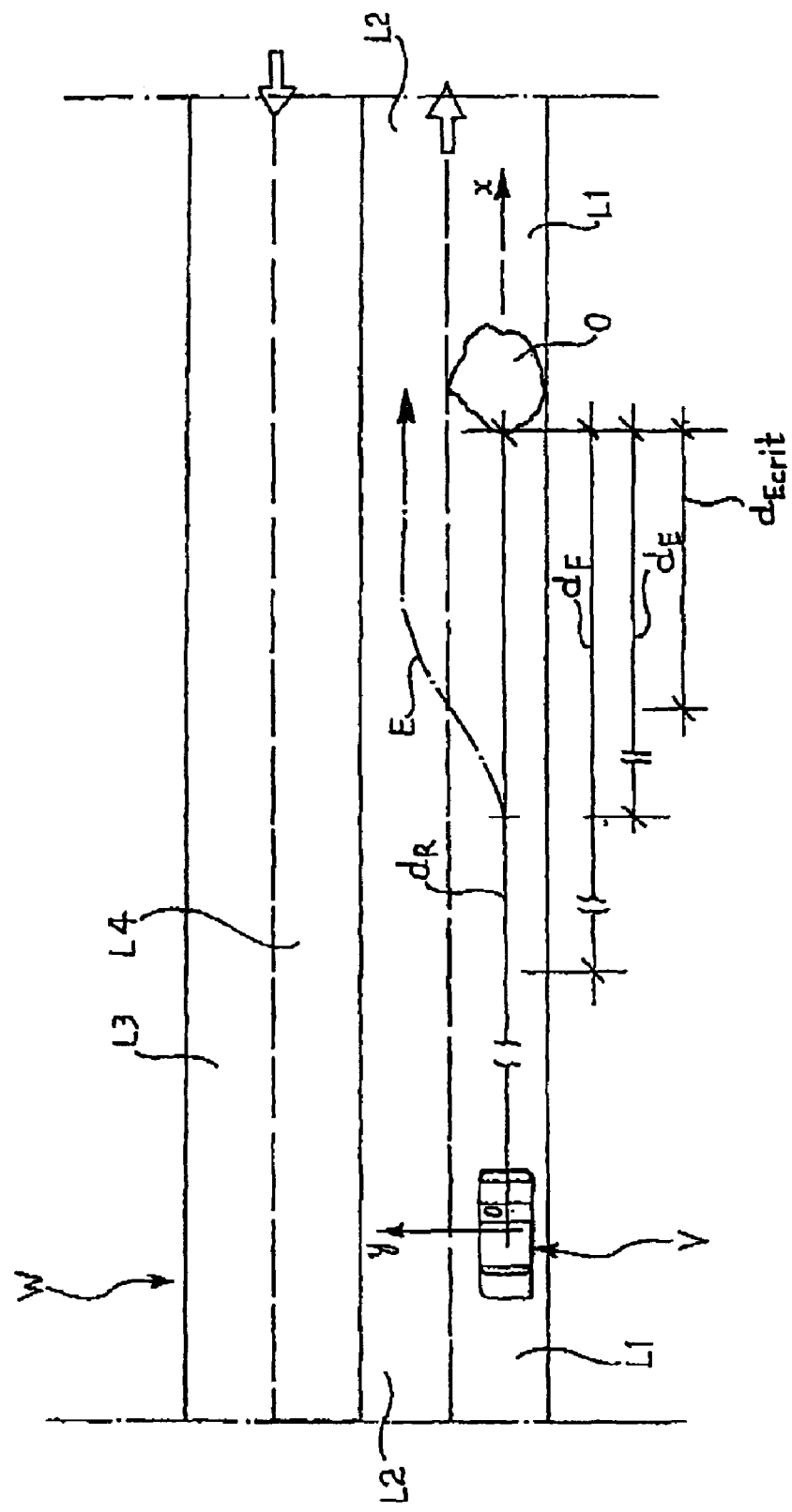
FIG. 2 is a schematic representation in plan view from above of a section of road travelled by a vehicle.

In FIG. 2 of the attached drawings there is shown a section of two-way roadway W having two lanes for each direction, indicated L1, L2, L3 and L4 respectively. In this figure there is shown a motor vehicle V travelling in the lane L1 in the direction towards the right as seen in the drawing.

An obstacle ahead of the vehicle V is indicated O. In the example illustrated the obstacle O is fixed, but as will be easily appreciated, the following considerations are valid also in relation to a possible moving obstacle, for example a motor vehicle proceeding in the same direction.

In order to activate the emergency braking function the processing and control unit ECU of the motor vehicle V is set up to detect the presence of the obstacle O by means of the information provided by the frontal radar 1. This radar makes it possible in particular to detect the relative distance $d_R$ between the motor vehicle V and the obstacle O, and also their relative speed $V_R$ as the difference between the speed (possibly nil) of the obstacle and that of the motor vehicle.

As soon as the unit ECU detects that the relative speed $V_R$ between the motor vehicle and the obstacle O becomes negative (obstacle approaching) this unit provides for dynamic evaluation of the minimum distance $d_F$ at which the braking system of the motor vehicle V must intervene automatically in order to perform automatic emergency braking if collision with the obstacle is to be avoided.

The unit ECU can be arranged to calculate the distance $d_F$ as a function of the (known) reaction times of the braking system, as well as the braking power which is at the moment still available, this information being providable to the unit ECU from the electronic unit 4 which supervises the braking system. The distance $d_F$ can further be calculated as a function of the ground-adhesion conditions which in a manner known per se can be detected by a suitable sensor (not illustrated), or can be indicated to the motor vehicle V from any roadway infrastructures (not illustrated) which may be available, or can be communicated from other vehicles.

The unit ECU can finally be arranged to calculate the distance $d_F$ in relation to different levels of braking power to be applied in the possible emergency braking operation depending on a preliminary setting made by the vehicle user.

In each case, when the relative distance $d_R$ approaches the calculated distance $d_F$ the unit ECU can, via the man-machine interface 5 provide an alarm indication to the motor vehicle driver, signalling to him the risk situation and stimulating him to activate the brakes so as to avoid the collision. If, however, the driver does not act in a suitable time, perhaps because of being distracted or unable to do so, the unit ECU triggers the automatic emergency braking, providing for this purpose corresponding signals to the electronic unit 4 which supervises the braking system.

Situations can however occur in which the relative distance $d_R$ between the motor vehicle V and obstacle O ahead is or becomes less than the distance $d_F$ in circumstances where it may be in general still possible to avoid collision with the obstacle O by performing a lateral avoidance manoeuvre. In FIG. 2 the reference $d_E$ indicates an intermediate value of the relative distance, less than $d_F$, starting from which, being it no longer possible to avoid the collision only by braking, it is attempted to avoid the collision—if possible—by performing a L lateral obstacle-avoidance manoeuvre. The value of $d_E$ is preselected on the basis of the characteristics of the motor vehicle. In the same FIG. 2, $d_{Ecrit}$ indicates the relative distance less than which it is no longer possible to avoid collision with the obstacle O, not even by effecting an avoidance manoeuvre.

If the relative distance $d_R$ is less than $d_{Ecrit}$ the unit ECU, via the braking control unit 4, controls the emergency braking at the maximum braking power available, for the purpose of reducing the inevitable collision damage to the minimum.

The obstacle-avoidance function performed by the driving aid system according to the invention, sets out to allow lateral avoidance of an obstacle which appears, even unexpectedly, in the path of the motor vehicle, preventing the normal continuance of travel in the same lane.

The automatic obstacle-avoidance manoeuvre is conveniently preceded by an alarm signal provided to the motor vehicle driver via the man-machine interface 5.

If the driver does not intervene immediately, for example because of being distracted or otherwise being unable to act, or if the available intervention time, taking into consideration the average reaction times of a driver, would make a manual obstacle-avoidance manoeuvre too late and therefore ineffective, the unit ECU is operable to assume control of the motor vehicle and to pilot the actuation of an obstacle avoidance manoeuvre in a totally automatic manner by controlling the steering actuator 8 associated with the steering column via the steering control unit 9 for the purpose of modifying the path of the vehicle for example in the manner indicatively illustrated by the chain line E in FIG. 2. The driver can always be informed about the progress of the manoeuvre by the man-machine interface 5, and can decide, if he so wishes, to interact with the automatic avoidance function.

The preliminary and necessary condition for actuation of an automatic obstacle-avoidance manoeuvre is that the set of signals provided by the short-range radar 17 and the video cameras 18 and 20 be indicative of the effective availability of a collision-avoidance path which allows the motor vehicle to avoid the obstacle by passing it to the left or to the right without colliding with other obstacles or vehicles overtaking from behind and without leaving the carriageway.

The processing and control unit ECU is therefore arranged to evaluate if the manoeuvre is achievable, or rather if a possible avoidance path exists. If so, and if the driver does not intervene, the unit ECU activates the obstacle avoidance function.

If the road has lanes delimited by continuous broken or painted lateral strips, during the avoidance manoeuvre the unit ECU can calculate the transverse position of the motor vehicle by means of data provided to it from the frontal video camera 16 which provides images from which it is possible to deduce the position of the vehicle with respect to the said lane demarcation lines, both in terms of distance and angle relative to the instantaneous path of the motor vehicle.

In the absence of lane demarcation lines the position of the motor vehicle can be reconstructed by the unit ECU by means of other sensors, for example a gyroscope and an accelerometer providing information on the yaw rate and lateral acceleration of the motor vehicle, and/or on the basis of information concerning the position of the motor vehicle which can be deduced from the signals provided by the frontal radar 1 and the lateral short-range radar 17.

An avoidance manoeuvre can be considered concluded from the moment the motor vehicle is displaced laterally by an amount sufficient to avoid the obstacle.

In a possible alternative, the obstacle-avoidance manoeuvre can instead be completed with a further manoeuvre back to the lane from which the vehicle started, obviously preceded by an analysis of the area surrounding the motor vehicle to evaluate the availability of this manoeuvre.

Figure 3:
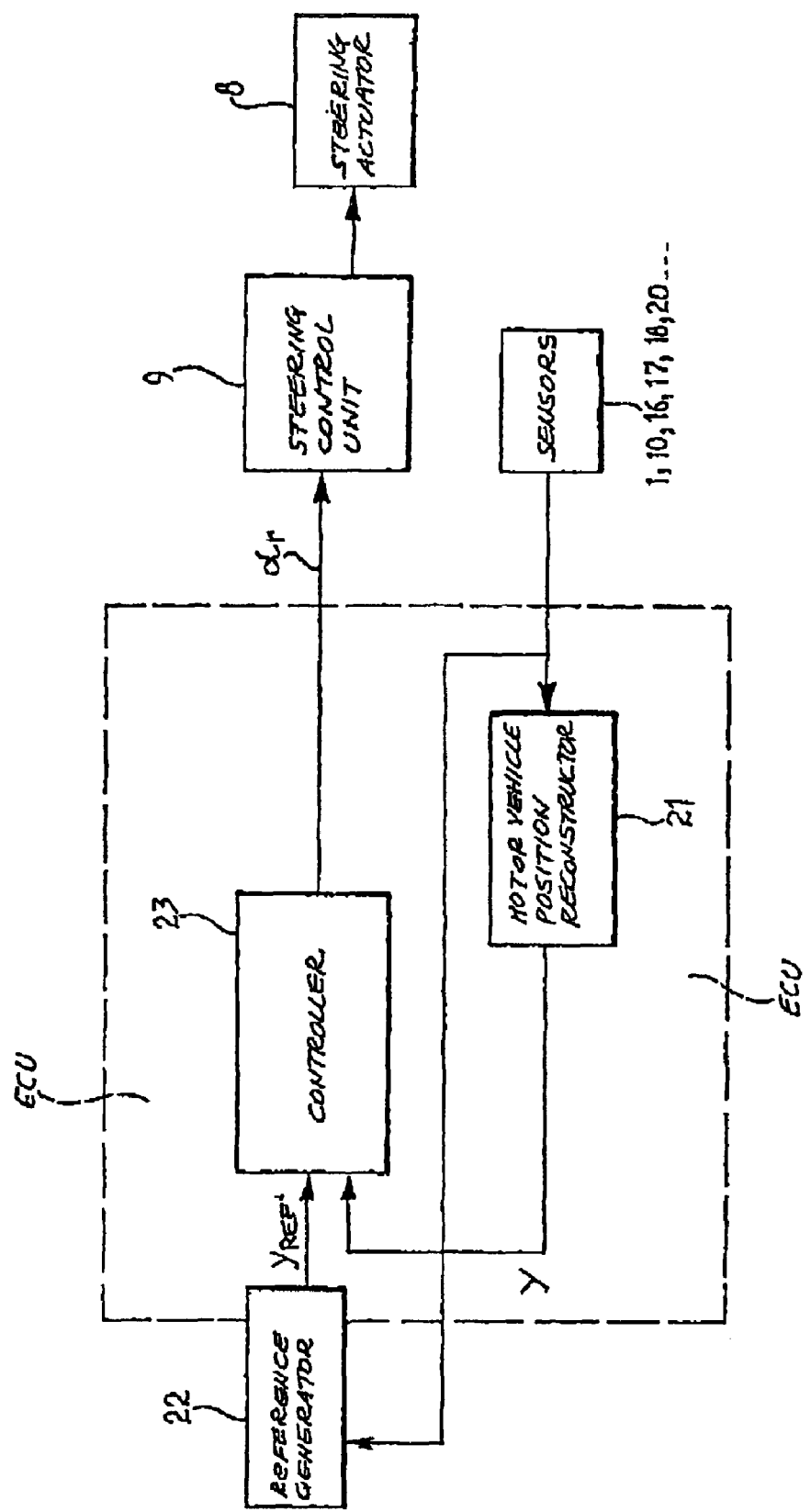
FIG. 3 is a block diagram of a part of the processing and control system included in the driving aid system according to the invention.

In FIG. 3 there is schematically illustrated the architecture of the control system for performing the obstacle-avoidance function. For this purpose the system comprises a motor vehicle position reconstruction unit 21 which receives information provided from the various sensors involved for the performance of the function. The reconstruction unit 21 provides output signals indicative of the transverse position y of the motor vehicle, for example in a co-ordinate system in which, as is schematically illustrated in FIG. 2, the x-axis coincides with the direction of forward movement of the vehicle, and the y-axis is a horizontal axis transverse the x-axis, passing through the centre of gravity of the motor vehicle.

At least some of the said sensors are moreover connected to a reference generator 22 which, following detection of the characteristics of the manoeuvring area, generates the profile or shape of an avoidance manoeuvre which the vehicle must possibly follow. This avoidance profile is substantially generated as a sequence of transverse position reference values $y_{ref}$. In order to calculate $y_{ref}$ the generator 22 takes into account both the relative speed between the motor vehicle and the obstacle and the position of the obstacle in the transverse sense.

The outputs of the position reconstruction unit 21 and the generator 22 are connected to the inputs of a controller 23 which generates signals indicative of the required steering angle $\alpha_r$ necessary to follow the avoidance profile produced by the generator 22.

The output of the controller 23 is connected to the steering control unit 9 which pilots the steering actuator 8.

Figure 4:
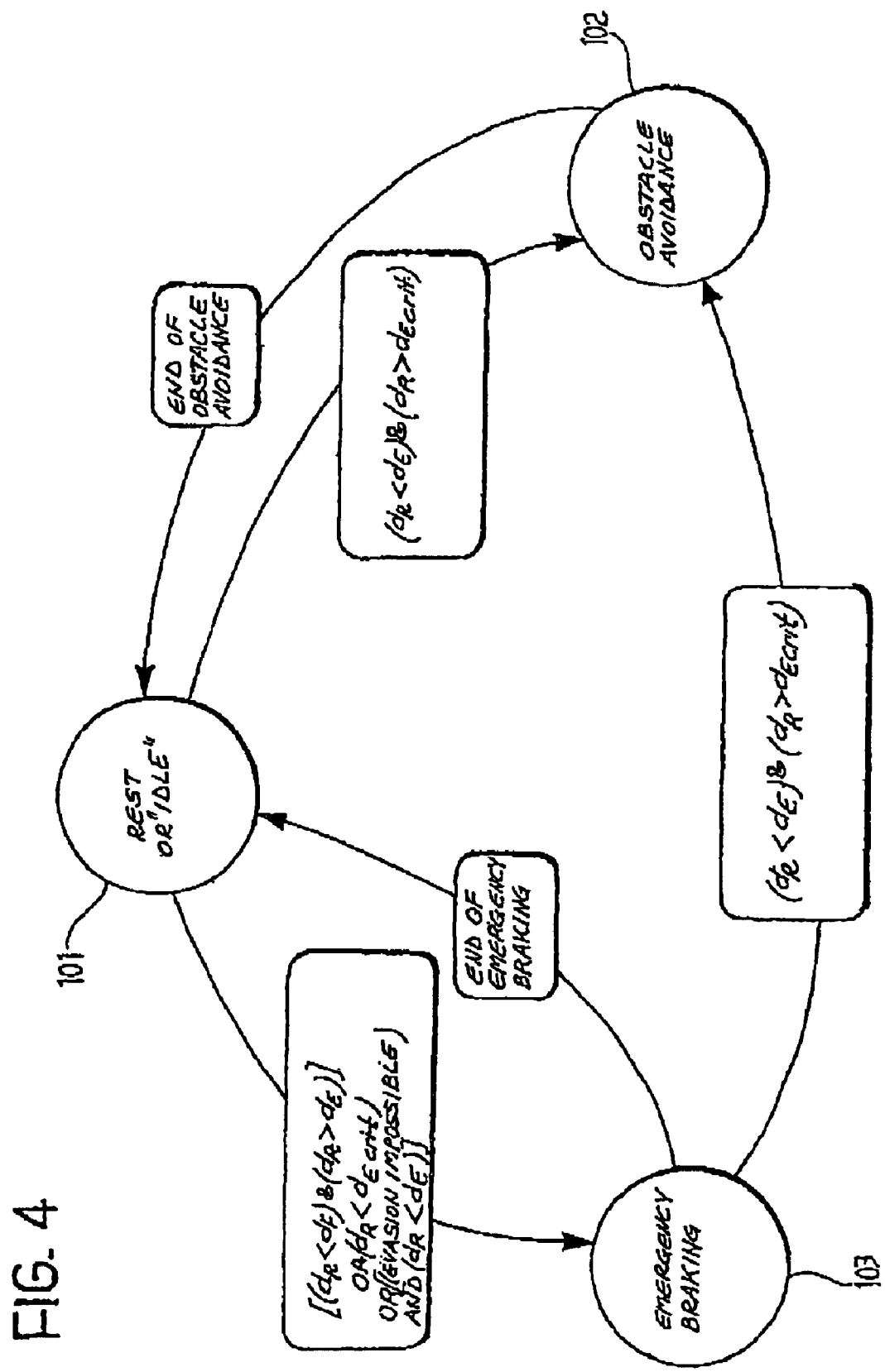
FIG. 4 is a diagram in which the states of the control system for the driving aid of the present invention are represented.

The logic for management of the emergency braking and obstacle avoidance functions can be described by means of a state machine which, as is schematically illustrated in FIG. 4, comprises three states indicated as:

rest or "idle" state;

obstacle avoidance state; and emergency braking state.

In FIG. 4 the said three states are represented with three "bubbles" indicated 101, 102 and 103. In FIG. 4 the transitions from one state to the other are indicated by arrows on which are superimposed respective blocks within which the conditions in which the respective state transition takes place are summarised.

The diagram of FIG. 4 is essentially self-explanatory and will not therefore be further described.

Figure 5:
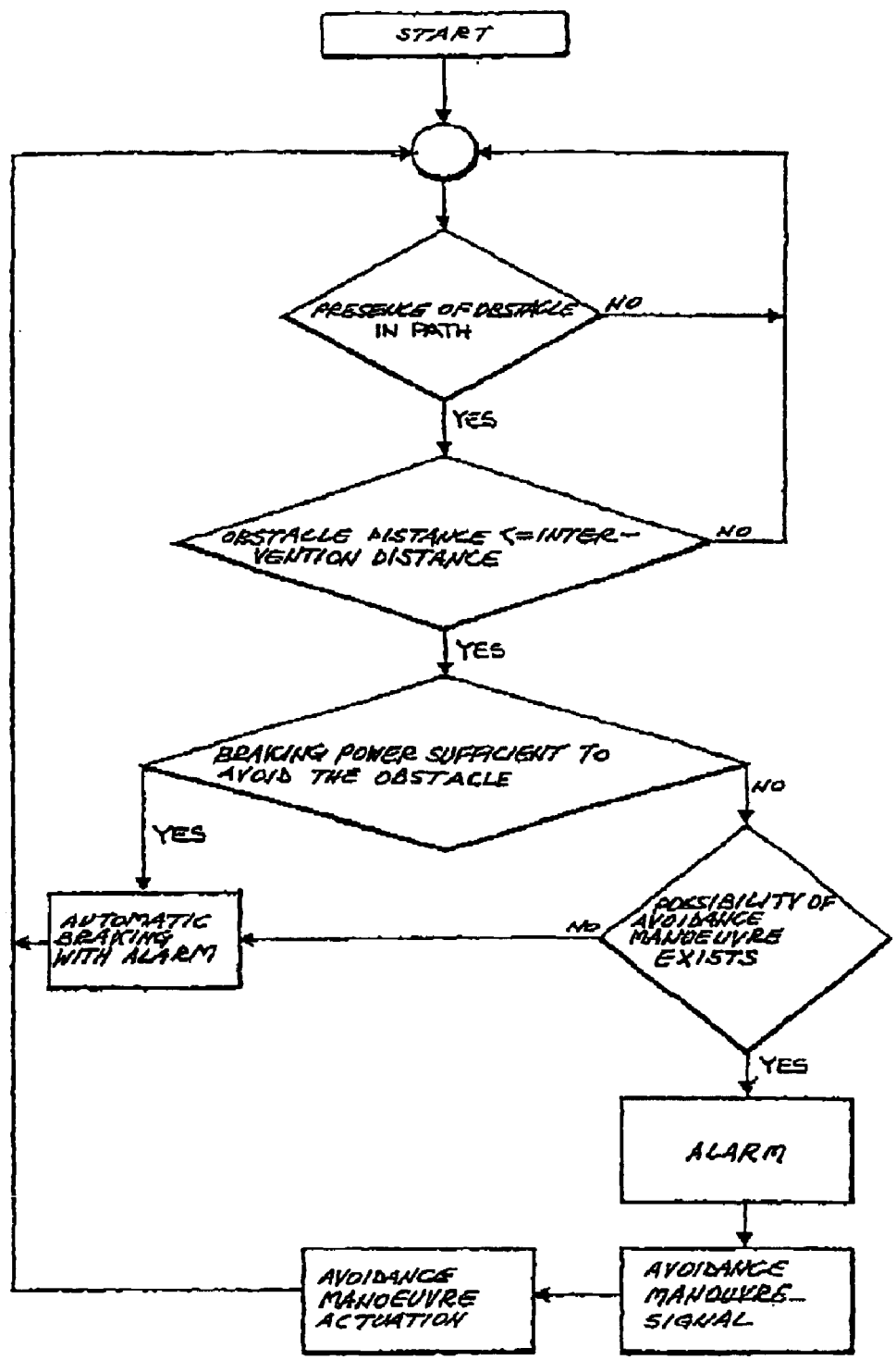
FIG. 5 is a flow diagram which illustrates the manner in which various functions of the driving aid system according to the invention operate.

Finally, in FIG. 5 there is presented a flow diagram which illustrates, likewise in a self-explanatory manner, the conditions essential for performing the emergency braking and obstacle avoidance functions.

Longitudinal Dynamic Control Function

As will appear more clearly hereinafter, the longitudinal dynamic control function of the motor vehicle (hereinafter generally called Longitudinal Control) essentially provides for integration of two sub-functions which will be defined "adaptive cruise speed control" in the Anglo-Saxon terminology, and "stop-and-go". This longitudinal control function has the object of assisting the driver by controlling the cruise speed of the motor vehicle or the safety distance with respect to the preceding vehicle along its path.

The said function is primarily actuated on the basis of information on the relative velocity $V_R$ and distance $d_R$ provided by the frontal radar 1 as well as the sensors 14 and 15 which provide signals indicative of the speed $V_F$ of the motor vehicle and the speed of rotation rpm of the motor vehicle engine.

The adaptive cruise control function of the cruise speed represents an extension of the traditional cruise speed control function and, therefore, as well as achieving and maintaining a speed set by the driver, is able to adapt the speed of the vehicle to that of the preceding motor vehicle with limited accelerations and decelerations.

The stop-and-go function represents an extension of the adaptive cruise speed control at low speeds in such a way as to be able to assist the driver even in urban traffic areas or when reversing.

Figure 6:
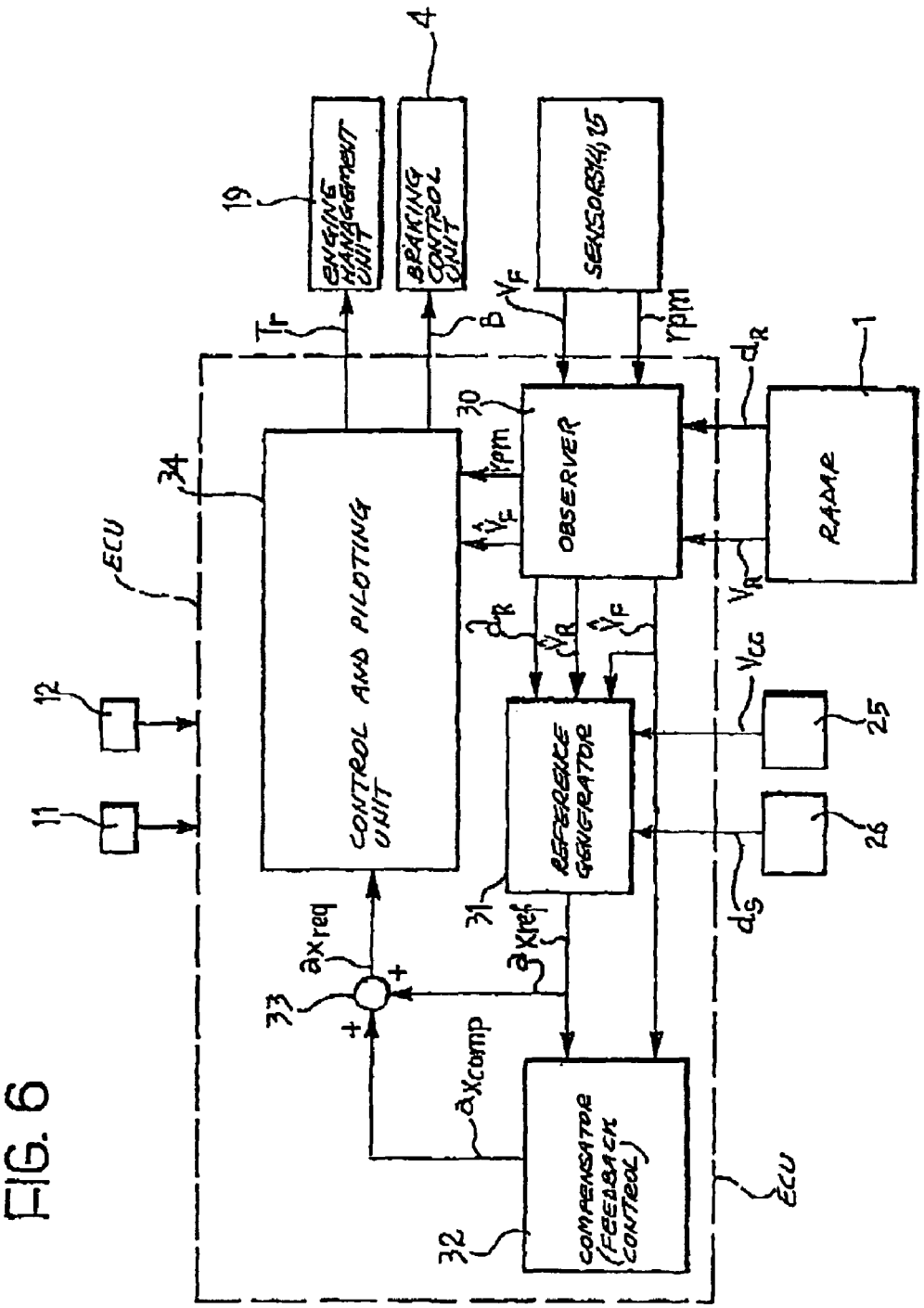
FIG. 6 is a block diagram which illustrates a further portion of the processing and control system for a driving aid system according to the invention.

As is shown in the block diagram of FIG. 6, the processing and control unit ECU which supervises the performance of the longitudinal control functions is connected to sensors 11 and 12 associated with the brake pedal and the accelerator pedal respectively. Each intervention on the brake pedal causes the function to be disabled, reinstating driver control of the motor vehicle, whilst pressure exerted on the accelerator pedal allows the set reference speed to be exceeded without necessarily disabling the function.

For setting the desired cruise speed or the desired safety distance the unit ECU is connected to respective manually-operated setting devices indicated 25 and 26 in FIG. 6.

As will appear more clearly hereinafter, for management of this function, the processing and control unit ECU is arranged to send the motor vehicle engine management unit 19 a signal $T_R$ indicative of the required torque value generated by the motor vehicle engine, or a signal B to the brake control unit 4, signal B being indicative of the required braking intensity. With reference to the block diagram of FIG. 6, which shows a possible control architecture, the signals provided by the sensors 14 and 15, as well as the signals provided by the frontal radar 1 arrive at an observer block 30. In this block signals are filtered with respect to noise and, if necessary, reconstructed.

The observer block 30 provides filtered signals $\hat{V}_F$, $\hat{V}_R$ and $\hat{d}_R$ to a reference signal generator 31 which also receives the indication of the desired cruise speed $v_{cc}$ or the desired safety distance $d_s$ to achieve and then maintain essentially constant.

The generator 31 is arranged to generate a reference signal $a_{xref}$ indicative of the relative longitudinal acceleration of the motor vehicle V as a function of the speed of the motor vehicle, the speed of rotation of the engine, the set value of the vehicle speed and the safety distance with respect to the preceding vehicle, as well as the relative distance and speed with respect to the obstacle ahead.

This signal is provided on the one hand to an input of a compensator block or feedback control 32, and on the other to an input of a summing unit 33. The compensator block 32 has a further input which receives the signal $\hat{V}_F$ from the observer block 30.

The compensator block 32 is arranged to perform a feedback control, for example, of proportional-integral type, and to provide in this case an output compensation signal $a_{xcomp}$ essentially proportional to the integral of the difference between the relative longitudinal acceleration $a_{xref}$ and the instantaneous longitudinal acceleration $a_F$ of the motor vehicle, this latter being calculated as the integral of the signal $\hat{V}_F$.

The output of the compensator block 32 is connected to a second input of the summing unit 33, which in operation therefore provides as output signal $a_{xreq}$ corresponding to the sum of the signals $a_{xref}$ and $a_{xcomp}$, as an acceleration demand signal representative of the required longitudinal acceleration of the motor vehicle V to achieve or maintain the set cruise speed value or safety distance.

The output of the summing unit 33 is connected to an input of a control and piloting block 34 arranged to generate, on the basis of a predetermined mathematical model of the motor vehicle, the signals $T_r$ and B for control of the torque generated by the engine of the motor vehicle and, respectively, of the motor vehicle brakes, as a function of the speed of the vehicle and the speed of rotation of the engine, as well as the said longitudinal acceleration demand signal $a_{xreq}$.

Figure 7:
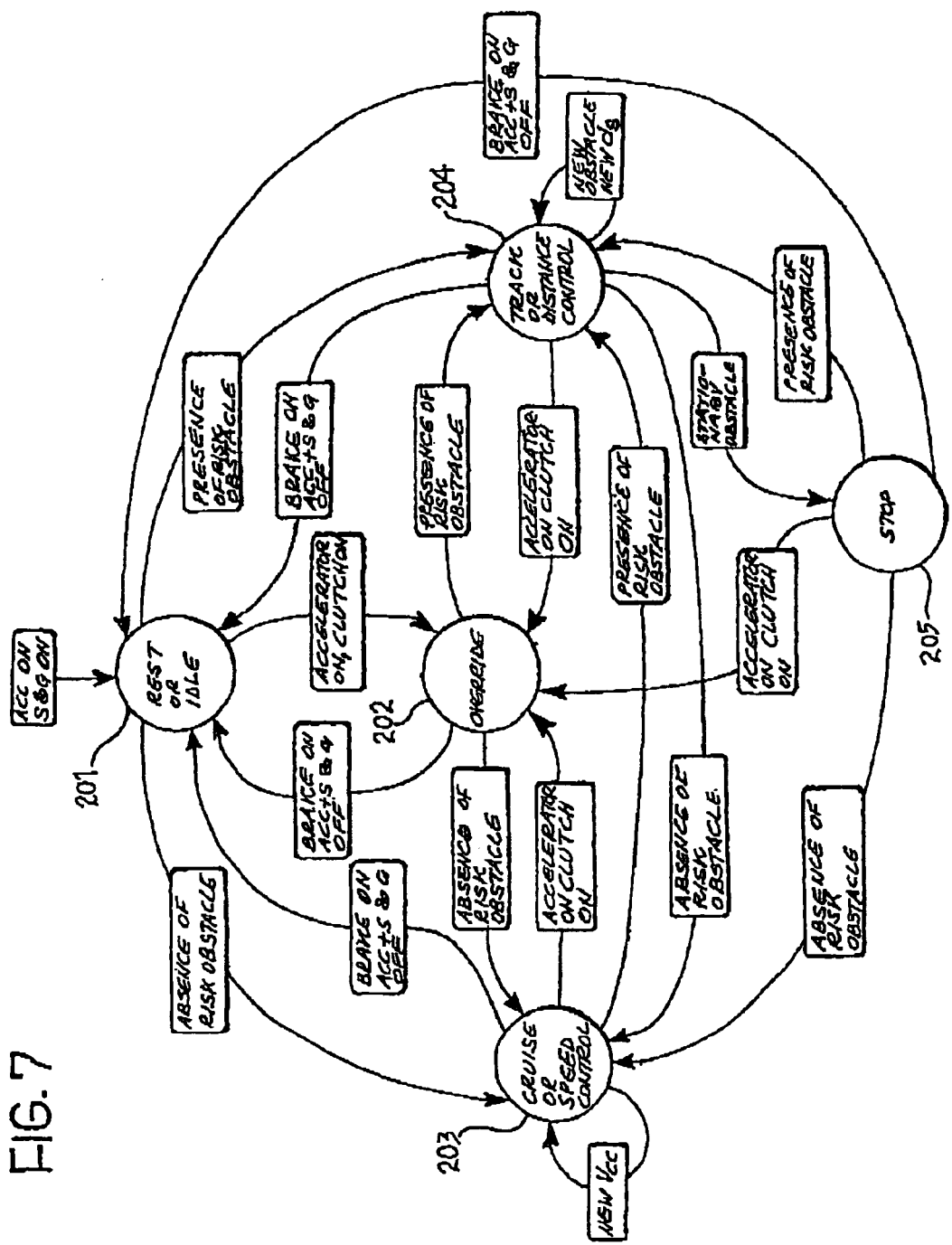
FIG. 7 is a diagram which illustrates the states of a control system for the driving aid of the invention.

The longitudinal dynamic control function of the motor vehicle can be achieved a state machine, for example in accordance with the five-state scheme shown in FIG. 7. This machine essentially provides the following states, identified in FIG. 7 with numerals 201, 205:

"Rest or Idle" 201: the longitudinal control function is disabled; return to this state from all the other states 202 to 205 from the moment the driver actuates the brake pedal, or inhibits the function, for example by acting on a suitable switch;

"Override" state 202: the transitions to this state take place if one of the following conditions occur;

1) there is a gear change in progress (clutch open or "on") and simultaneously the driving aid system is not yet requesting intervention of the braking system;

2) the driver presses the accelerator pedal: the function is put on standby and the control of the motor vehicle is returned to the driver.

"Cruise" or "speed control" state 203: in this state the system tends to achieve and then maintain the cruise speed $V_{cc}$ set by the driver;

"Track" or "distance control" state 204: the system tends to achieve and maintain the safety distance $d_s$ set by the driver relative to the preceding vehicle; and "Stop" state 205: a state in which the control is momentarily "frozen" and the motor vehicle is maintained stationary.

The labels which in FIG. 7 are superimposed over the transition arrows generally indicate in a self-explanatory manner the conditions for passage from one state to another.

The captions in these labels have essentially the following significations:

ACC=ON: adaptive control function of the cruise speed turned on;

S&G=ON: Stop-and-Go function turned on;

Accelerator=ON: accelerator pedal pressed;

Brake=ON: brake pedal pressed;

Clutch=ON: clutch open;

Obstacle Absence/Presence: absence or presence of obstacle indicated by the frontal radar 1 in the path of the vehicle;

New $v_{cc}$: new value of cruise speed set;

New $d_s$: new safety distance set;

New obstacle: detection of a new obstacle.

Lane Maintenance Function

This function will find wide approval from those who, for various reasons, are constrained to utilise the motor vehicle as a means of transport for a large number of hours and on long journeys.

This function, by characteristics which will be illustrated, belongs both to the family of driving aid functions in that it serves to alleviate the tension load which a driver experiences after a long time driving a motor vehicle, but at the same time also belongs to the family of preventive safety functions since it guarantees a good margin of safety in relation to actions consequent on distractions or temporary lapses of the driver.

This function allows, as will be seen, for the vehicle to be automatically returned to the lane in which it had been travelling without any direct intervention from the steering wheel by the driver.

The function is actuated by utilising the information provided by vision sensors such as the video camera 16, with associated image-processing devices operable to analyse the geometry of the road ahead of the vehicle in motion and its position with respect to the lateral limits of the lane in which it is travelling.

The correction, where necessary, of the path of the motor vehicle is achieved by means of the steering actuator 8 with a feedback control based on the information from the sensor 10 associated with the steering column 6.

The control architecture can include essentially an observer, which on the basis of the information provided from the sensor 10 associated with the steering column reconstructs the lateral position of the vehicle within the ambit of the lane and estimates the states necessary for a closed loop position controller. This controller, which supervises the lateral displacement of the vehicle, compares the information coming from the observer with that coming from a reference generator prearranged to generate a comfortable path or profile which the motor vehicle must follow to bring it from the instantaneous position towards the centre of the lane in which the vehicle is travelling. The lateral displacement controller generates at its output a signal indicative of the steering angle necessary to bring the motor vehicle to the centre of the lane. This signal is imparted to the steering control unit 9 which correspondingly pilots the steering actuator 8.

Conveniently, the lane maintenance function is of co-operative type in the sense that action exerted by the control system is compatible with the natural inclination to manual guidance by the driver. In other terms, the system allows the driver to guide the motor vehicle manually whenever the system recognises the intention of the driver to wish to move the vehicle away from the ideal zone (road centre) in which it seeks to maintain the motor vehicle.

To this end the processing control unit which supervises the function is conveniently arranged to reduce the weight of the control action when the driver applies a torque greater than a predetermined value to the steering column and/or to interrupt the control action when the driver activates a direction indicator.

In a variant the co-operative lane maintenance function can be combined with traffic monitoring to the side and behind the vehicle by means of sensors such as, for example, the lateral radar 17 and the video cameras 18, and the processing and control unit ECU can be arranged to pilot the steering actuator means in such a way that these resist, by applying opposing torque to the steering shaft 6, displacements caused by the driver which would bring it into collision with overtaking vehicles or with lateral obstacles. The resisting torque can be modulated as a function of the degree of risk of the manoeuvre.

Overall Anti-Collision Function

The integration and the synergy of previously-described functions makes it possible to achieve an overall or global anti-collision system to increase the safety on board the motor vehicle by avoiding, in emergency conditions, collision with an obstacle or by limiting the consequences of a possible collision.

The elementary functions of the driving aid usable to achieve a system of this type are as follows:

Emergency Brake:

Obstacle Avoidance;

Lane Maintenance;

Longitudinal Control; and

Emergency Brake and Lane Maintenance.

On the basis of signals from the sensor system (radar 1, short-range radar 17, video cameras, etc), as well as from the engine management unit, steering unit, gearbox, brakes and the man-machine interface 5. The system is able to monitor the area around the vehicle V and to cause intervention of the function which is best adapted, in terms of safety, to the detected scenario. The system is then able to recognise a dangerous scenario, for example in which an obstacle impedes the progress of the vehicle, to signal this to the driver and, in the event of the driver not intervening, to automatically enable the most suitable emergency functions.

The co-operative lane maintenance function, combined with the monitoring of the area surrounding the motor vehicle can be conveniently always active. The other functions may, on the other hand, be selectively activated or de-activated by the driver.

Figure 8:
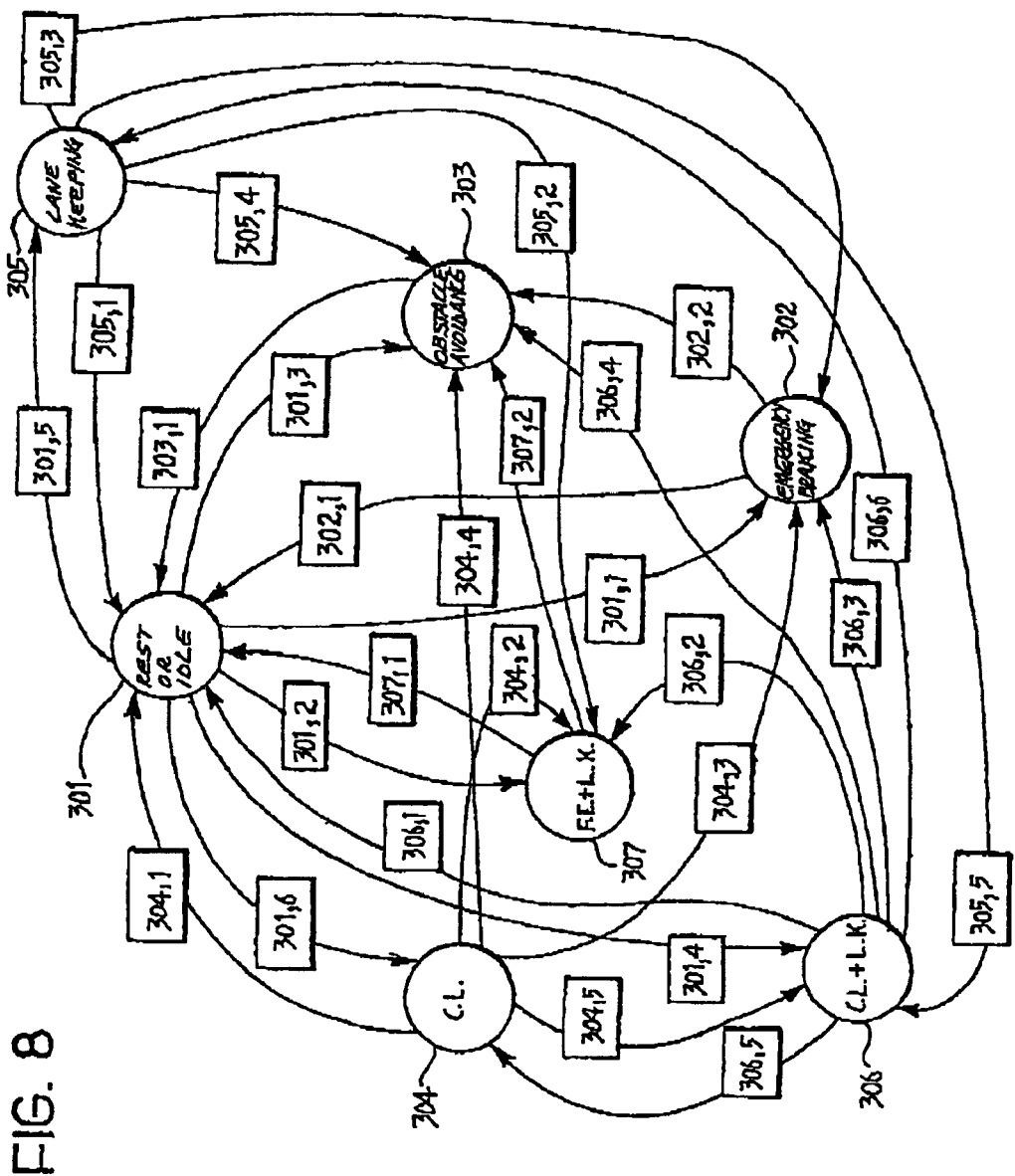
FIG. 8 is a diagram which illustrates the states of an overall control system for the driving aid according to the invention.

In the diagram of the states shown in FIG. 8 the functions are represented by bubbles, whilst the conditions of passing from one state to the other are represented by transition arrows.

In the diagram of FIG. 8 appears a bubble 301 corresponding to the Rest or "Idle" state, a bubble 302 corresponding to the Emergency Brake state, a bubble 303 corresponding to the "Obstacle Avoidance" state, and a bubble 304 corresponding to the "Longitudinal Control" state, a bubble 305 corresponding to the "Lane Maintenance" state. As well as these bubbles, the diagram of FIG. 8 shows a bubble 306 denominated "Longitudinal Control and Lane Maintenance", in which the "Longitudinal Control" and "Lane Maintenance" functions can be considered as a single state inasmuch as they are both enabled. In fact, the signals for actuation of Longitudinal Control and Lateral Control do not ever come into conflict with one another and it is therefore possible to operate a control strategy which involves simultaneously acting on the engine, the braking system and the steering system.

In the diagram of FIG. 8 there is a further bubble 307 denominated "Emergency Brake and Lane Maintenance" for this bubble similar considerations to those explained above in relation to the bubble 306 apply.

All the transitions of the state machine of FIG. 8 will now be described, which transitions essentially describe all the possible scenarios which can occur during a normal journey of a motor vehicle.

In FIG. 8 the labels relating to each transition have an associated number which represents the priority of the transition itself with respect to all those which exit from the same state under examination.

In the conditions described hereinafter both the signals from the man-machine interface 5 and those from the various sensors or detectors or their processing are taken into account.

The various states and associated transitions will now be described.

301—Rest or Idle State

In this state the system, whilst monitoring the scenario, does not intervene on the actuators. From this state the following transitions are possible.

301.1—Transition to the Emergency Braking State

If the sensing system identifies a dangerous obstacle in the lane in which the vehicle is travelling, at a distance less than an intervention limit distance calculated according to a pre-established manner, and if, moreover, the relative speed is negative and the maximum braking power available makes it possible to avoid the collision, or does not make it possible to avoid it but there is no possibility of per se forming a lateral avoidance manoeuvre, then it passes to the emergency braking state.

301.2—Transition to the Emergency Braking and Lane Maintenance State

If the sensing system is able to detect the geometry of the lane in which the vehicle is travelling and if in this lane there has been identified an obstacle at a distance less than the said intervention distance, and if the relative velocity is negative and the maximum available braking power allows collision avoidance, or does not allow avoidance but there is no possibility of a lateral avoidance manoeuvre, then it passes to the Emergency Braking plus Lane Maintenance state.

301.3—Transition to the Obstacle Avoidance State

If the sensing system has identified an obstacle in the lane in which the vehicle is travelling, at a distance less than the said intervention distance, and if the relative speed is negative and the maximum available braking power does not allow collision avoidance and the possibility of performing a lateral avoidance manoeuvre exists, then it passes to the Obstacle Avoidance state.

301.4—Transition to the Longitudinal Control and Lane Maintenance State

If the sensing system is able to detect the geometry of the lane in which the vehicle is travelling, and the driver has requested the Longitudinal Control function, it passes to the Longitudinal Control plus Lane Maintenance state.

301.5—Transition to the Lane Maintenance State

If the sensing system is able to detect the geometry of the lane in which the vehicle is travelling, it passes from the idle state to the Lane Maintenance state.

301.6—Transition to the Longitudinal Control State

If the driver has selected the Longitudinal Control function it passes to the Longitudinal Control state.

302—Emergency Braking State 302.1—Transition to the Idle State

If the emergency braking is terminated (because a relative speed greater than or equal to zero has been reached and the relative distance has become greater than the intervention distance) it passes to the Idle state.

302.2—Transition to the Obstacle Avoidance State

If during emergency braking the system detects that, following a variation in the distance and relative speed conditions of the obstacle, the maximum braking power is not sufficient to avoid the collision, it executes a transition to the Obstacle Avoidance state if the possibility of executing a lateral manoeuvre still exists.

303—Obstacle Avoidance State 303.1—Transition to the Idle State

If the obstacle avoidance is terminated, the calculated avoidance path having been followed, it passes to the Idle state.

304—Longitudinal Control State 304.1—Transition to the Idle State

If the user de-activates the Longitudinal Control function it passes to the Idle state.

304.2—Transition to the Emergency Braking plus Lane Maintenance State

If the sensing system is able to determine the geometry of the lane in which the vehicle is travelling, and if an obstacle has been detected in this lane at a distance less than the intervention distance, and the relative speed is negative and the maximum available braking power allows collision avoidance, or does not allow it but the possibility of executing a lateral avoidance manoeuvre does not exist, then it passes to the Emergency Braking plus Lane Maintenance state.

304.3—Transition to the Emergency Braking State

If the sensing system has identified an obstacle in the lane in which the vehicle is travelling at a distance less than the intervention distance, and if the relative speed is negative and the maximum available braking power allows collision avoidance, or does not allow collision avoidance but the possibility of effecting a lateral avoidance manoeuvre does not exist, then it passes to the Emergency Braking state.

304.4—Transition to the Obstacle Avoidance State

If the sensing system has identified an obstacle in the lane in which the vehicle is travelling, at a distance less than the intervention distance, and if the relative speed is negative and the maximum available braking power does not allow collision avoidance but the possibility of executing a lateral avoidance manoeuvre exists, then it passes to the Obstacle Avoidance state.

304.5—Transition to the Longitudinal Control plus Lane Maintenance State

If the sensing system is able to detect the geometry of the lane in which the vehicle is travelling, it passes to the Longitudinal Control plus Lane Maintenance state.

305—Lane Maintenance State 305.1—Transition to the Idle State

If the sensing system is not able to detect the geometry of the lane in which the vehicle is travelling it passes to the Idle state.

305.2—Transition to the Emergency Braking plus Lane Maintenance State

If the sensing system is able to detect the geometry of the lane in which the vehicle is travelling and if an obstacle in the lane has been identified at a distance less than the intervention distance, and the relative speed is negative and the maximum available braking power allows collision avoidance, or does not allow collision avoidance but the possibility of effecting a lateral avoidance manoeuvre does not exist, then it passes to the Emergency Braking plus Lane Maintenance state.

305.3—Transition to the Emergency Braking State

If the sensing system has identified an obstacle in the lane in which the vehicle is travelling at a distance less than the intervention distance, if the relative speed is negative, and the maximum available braking power allows collision avoidance, or does not allow collision avoidance but the possibility of effecting a lateral avoidance manoeuvre does not exist, then it passes to the Emergency Braking state.

305.4—Transition to the Obstacle Avoidance State

If the sensing system has identified an obstacle in the lane in which the vehicle is travelling, at a distance less than the intervention distance, and if the relative speed is negative and the maximum available braking power does not allow collision avoidance, but the possibility of executing a lateral avoidance manoeuvre exists, then it passes to the Obstacle Avoidance state.

305.5—Transition to the Longitudinal Control plus Lane Maintenance State

If the user activates the Longitudinal Control function it passes to the Longitudinal Control plus Lane Maintenance state.

306—Longitudinal Control plus Lane Maintenance State 306.1—Transition to the Idle State If the sensing system is not able to detect the geometry of the lane in which the vehicle is travelling and if the user de-activates the Longitudinal Control function it passes to the Idle state.

306.2—Transition to the Emergency Braking plus Lane Maintenance State

If the system is able to detect the geometry of the lane and if an obstacle in the lane has been identified at a distance less than the intervention distance, and if the relative speed is negative and the maximum available braking power allows collision avoidance, or does not allow collision avoidance and the possibility of executing a lateral avoidance manoeuvre does not exist, then it passes to the Emergency Braking plus Lane Maintenance state.

306.3—Transition to the Emergency Braking State

If an obstacle has been identified in the lane in which the vehicle is travelling at a distance less than the intervention distance, and if the relative speed is negative and the maximum available braking power allows collision avoidance, or does not allow collision avoidance and the possibility of effecting a lateral avoidance manoeuvre does not exist, then it passes to the Emergency Braking state.

306.4—Transition to the Obstacle Avoidance State

If an obstacle has been identified in the lane in which the vehicle is travelling, at a distance less than the intervention distance, and if the relative speed is negative and the maximum available braking power allows collision avoidance and the possibility of executing a lateral avoidance manoeuvre exists, then it passes to the Obstacle Avoidance state.

306.5—Transition to the Longitudinal Control State

If the sensing system is not able to detect the geometry of the lane in which the vehicle is travelling it passes to the Longitudinal Control state.

306.6—Transition to the Lane Maintenance State

If the user deactivates the Longitudinal Control function it passes to the Lane Maintenance state.

307—Emergency Braking plus Lane Maintenance State 307.1—Transition to the Idle State If the Emergency Braking is terminated (because a relative speed greater than or equal to zero is achieved and the relative distance has become greater than the intervention distance) it passes to the Idle state.

307.2—Transition to the Obstacle Avoidance State

If during emergency braking the maximum braking power is not sufficient, upon a variation in the distance and relative speed conditions of the obstacle, to avoid the collision, it passes to the Obstacle Avoidance state if the possibility of executing a lateral avoidance manoeuvre still exists.

Naturally, the principle of the invention remaining the same, the embodiments and details of construction can be widely varied with respect to what has been described and illustrated clearly by way of non-limitative example, without by this departing from the ambit of the invention as defined in the attached claims.

What is claimed is:

1. A driving aid system (V) for a motor vehicle provided with electrically-controlled brake actuator means (2–4), the aid system comprising:

first detector means (1) operable to provide electrical signals indicative of the relative distance and relative speed of the of the motor vehicle (V) with respect to a fixed or moving obstacle (O) ahead, and first sensor means (14, 15) operable to provide signals indicative of the longitudinal speed of the motor-vehicle, and processing and control means (ECU) connected to the said first detector means (1) as well as to the said brake actuator means (2–4) and arranged to detect the occurrence of a first operating condition in which the relative distance ($d_R$) between the motor vehicle (V) and the obstacle (O) ahead is comprised between a first predetermined limit value ($d_F$), equal to the minimum value at which it is still possible to avoid the collision by braking and a preselected intermediate value ($d_E$), comprised between said first limit value ($d_F$) and a second limit value ($d_{Ecrit}$) which is less than the said first limit value ($d_F$) and is equal to the minimum relative distance at which it is still possible to follow an avoidance path around the obstacle (O); and a second operating condition in which the relative distance ($d_R$) is less than said second limit value ($d_{Ecrit}$); and cause activation of the said brake actuator means (2–4) to effect an automatic emergency braking of the motor vehicle (V) upon the occurrence of one of said operating conditions;

the system being characterised in that the said processing and control means (ECU) are further coupled to an electronic control system (19) for the propulsion means of the motor vehicle, and are operable, on the basis of signals provided from the said first detector means (1), to effect control of the longitudinal speed of advance of the motor vehicle (V) in such a way as to tend to maintain the longitudinal speed of the motor vehicle at a predetermined value when the said first detector means (1) do not indicate an obstacle ahead within a predetermined range or, selectively, the relative distance with respect to a vehicle ahead proceeding in the same direction, when the first detector means (1) indicate the presence thereof within a predetermined range;

said first sensor means (14, 15) being operable to also provide signals indicative of the speed of rotation of the engine of the motor-vehicle;

the said processing and control means (ECU) including reference signal generator means (31) coupled to the said first sensor means (14, 15) and to the said first detector means (1) and arranged to generate a reference signal ($a_{xref}$) indicative of the relative longitudinal acceleration for the motor vehicle (V) as a function of the distance and relative speed with respect to the obstacle ahead, the longitudinal speed of the motor vehicle and the speed of rotation of the engine as well as the set value of the speed of advance of the vehicle or of the safety distance relative to a preceding vehicle (V);

feedback control means (32) connected to the said reference signal generator means (31) and arranged to provide an output compensation signal ($a_{xcomp}$) which is a function of the difference between the relative acceleration signal ($a_{xref}$) and the instantaneous longitudinal acceleration ($a_F$) of the motor vehicle (V);

summing means (33) operable to provide an output acceleration demand signal ($a_{xreq}$) for the motor vehicle, essentially proportional to the sum of the said reference signal ($a_{xref}$) and the compensation ($a_{xcomp}$), and piloting and control means (34) operable to generate, on the basis of a predetermined mathematical model of the motor vehicle (V), control signals ($T_R$; B) of the torque generated by the motor vehicle and/or of the motor vehicle braking intensity as a function of the longitudinal speed of the vehicle, the speed of rotation of the engine and the said longitudinal acceleration demand signal ($a_{xreq}$).

2. A system according to claim 1, in which the said processing and control means (ECU) are further arranged to activate signalling means (5) operable to provide the driver with an indication of the opportunity of performing a lateral avoidance maneuver around an obstacle (O) when the relative distance between the motor vehicle (V) and an obstacle ahead lies between said intermediate value ($d_E$) and the second limit value ($d_{Ecrit}$).

3. A system according to claim 1, for a motor vehicle (V) further provided with electrically-controlled steering actuator means (8, 9); the system further including second detector means (17, 18) operable to provide electrical signals usable to evaluate the viability of a possible avoidance path around an obstacle (O) ahead of the motor vehicle (V); the processing and control means (ECU) means being further arranged to control the said steering actuator means (8,9) automatically in a predetermined manner to follow an avoidance path around an obstacle (O) ahead if the relative distance between the motor vehicle (V) and said obstacle (O) has a value lying between said intermediate value ($d_E$) and the second limit value ($d_{Ecrit}$).

4. A system according to claim 3, wherein the processing and control means (ECU) are arranged to cause activation of the said brake actuator means (2–4) to effect an automatic emergency braking, when the relative distance ($d_R$) lies between the above-said intermediate value ($d_E$) and the second limit value ($d_{Ecrit}$) and said second detector means (17, 18) indicate the impossibility of performing a lateral avoidance path around the obstacle (O).

5. A system according to claim 3, in which the processing and control means (ECU) have associated therewith third detector means (20) operable to provide signals indicating the presence, the distance and the relative speed of vehicles overtaking the motor vehicle (V) from behind, and the said processing and control means (ECU) are also arranged to activate the said braking actuator means (2–4) and/or the steering means (8, 9) in dependence on the distance and relative speed of the vehicles overtaking the motor vehicle (V) from behind.

6. A system according to claim 1, for a vehicle provided with further detector means (11, 12) for detecting the position of the brake control pedal and the accelerator pedal, the said processing and control means (ECU) being connected to the said further detector means (11, 12) and being arranged to interrupt the control of the longitudinal speed of the motor vehicle (V) when one of the said pedals is actuated.

7. A system according to claim 1, in which the said feedback control means (32) are of proportional-integral type and the said compensation signal ($a_{xcomp}$) is essentially proportional to the integral of the difference between the relative acceleration ($a_{xref}$) and the instantaneous longitudinal acceleration ($a_F$) of the motor vehicle (V).

8. A system according to claim 1 for a motor vehicle (V) provided with electrically-controlled steering actuator means (8, 9); the system further comprising fourth detector means (16) operable to provide signals usable to identify the instantaneous position of the motor vehicle (V) relative to detectable demarcation means which delimit or define the road lane in which the motor vehicle (V) is travelling;

the said processing and control means (ECU) being connected to the said fourth detector means (16) and arranged to determine the instantaneous position of the motor vehicle (V) relative to the said demarcation means; and control the said actuator means (8, 9) in a predetermined manner in such a way that the motor vehicle (V) continues to proceed within the said road lane.

9. A system according to claim 8, for a motor vehicle (V) with a steering column (6) which has an associated sensor means (10) operable to provide signals indicative of the torque applied to this column (6) by the driver, and in which there are provided sensor means (13) for detecting activation of the direction indicators; said processing and control means (ECU) being arranged to reduce the weight of the control action of the said steering actuator means (8, 9) when the driver applies to the steering column (6) a torque greater than a predetermined value and/or to interrupt the said control action when the driver activates a direction indicator.

10. A system according to claim 8, including further detector means (17, 18) operable to provide signals able to allow a monitoring of the traffic to the sides and rear of the motor vehicle (V), and in which the said processing and control means (ECU) are further arranged to pilot the steering actuator means (8, 9) in such a way as to apply to the steering column a resisting torque when the driver tends to displace the vehicle laterally whilst the signals provided by the said further detector means (17, 18) are indicative of a situation which could lead to a collision of the motor vehicle (V) with other overtaking motor vehicles or with lateral obstacles.

* * * * *